United States Patent [19]

Ohkawa et al.

[11] Patent Number: 5,426,991
[45] Date of Patent: Jun. 27, 1995

[54] AUTOMATIC TRANSMISSION

[75] Inventors: Yuzo Ohkawa, Higashihiroshima; Hidehiko Mishima, Hiroshima; Kazunori Enokido, Aki; Tatsutoshi Mizobe; Toshihisa Marusue, both of Hiroshima, all of Japan

[73] Assignee: Mazda Motor Corporation, Hiroshima, Japan

[21] Appl. No.: 46,988

[22] Filed: Apr. 16, 1993

[30] Foreign Application Priority Data

Apr. 20, 1992 [JP] Japan .................. 4-128173
Jun. 4, 1992 [JP] Japan .................. 4-144134

[51] Int. Cl.⁶ .................. F16H 37/08; F16H 57/02
[52] U.S. Cl. .................. 74/331; 74/606 R
[58] Field of Search .................. 74/331, 606 R

[56] References Cited

U.S. PATENT DOCUMENTS

| | | | |
|---|---|---|---|
| 4,722,242 | 2/1988 | Miura et al. | 74/606 R |
| 4,934,215 | 6/1990 | Miura et al. | |
| 4,950,213 | 8/1990 | Morisawa | 74/606 R |
| 5,090,950 | 2/1991 | Sugano et al. | 74/606 R |

FOREIGN PATENT DOCUMENTS 61-99745 5/1986 Japan .
62-4950 1/1987 Japan .

Primary Examiner—Edward K. Look
Assistant Examiner—James A. Larson
Attorney, Agent, or Firm—Fish & Richardson

[57] ABSTRACT

An automatic transmission includes a first transmission mechanism having a first shaft connectable to an output shaft of an engine, a second transmission mechanism associated with the first transmission mechanism, and having a second shaft in parallel with the first shaft, the second transmission mechanism being adapted for changing the torque speed of the first shaft, a hydraulic housing for accommodating a hydraulic control device for the second transmission mechanism, the second hydraulic housing being arranged above the second transmission mechanism, and an axis of the second shaft being positioned on either the same horizontal plane as an axis of the first shaft or a horizontal plane above the axis of the first shaft.

4 Claims, 12 Drawing Sheets

000
AUTOMATIC TRANSMISSION

BACKGROUND OF THE INVENTION

1. Field of the Invention

This invention relates to an automatic transmission installed in an automotive vehicle.

2. Discussion of the Related Art

Automatic transmissions having a torque converter and a transmission gear mechanism to automatically change the speed stages are known in the art. The torque converter changes the torque speed of an engine output shaft and transmits the resultant torque to a turbine shaft. The transmission gear mechanism changes the torque speed of the turbine shaft, and transmits the resultant torque to drive wheels of a vehicle.

The transmission gear mechanism includes a planetary gear comprising a sun gear, a ring gear, pinion gears, a carrier, and the like. A variety of friction elements are provided in the transmission gear mechanism, such as a clutch which can be engaged to transmit torque to a specified gear or carrier, and a brake for locking or releasing the specified gear or carrier. An engagement pattern of these friction elements is changed using, for example, a hydraulic mechanism. Thus, the gear is shifted by switching the speed stages step-wise.

In an automatic transmission provided with the above transmission gear mechanism, more speed stages in the transmission gear mechanism result in a greater selection of torque transmission characteristics. This allows a vehicle to be driven in a manner suitable to road or running conditions, and thereby improves vehicle mileage and performance. However, with a single transmission gear mechanism only a limited number of speed stages can be provided, which is normally a maximum of four forward gears.

In view of the above, there has been proposed a multistage automatic transmission in which a main transmission and sub-transmission are provided in series (with respect to a direction of torque transmission). Combining the speed stages of the two transmissions allows the automatic transmission to have an increased number of speed stages. The above automatic transmission is disclosed, for example, in Japanese Unexamined Patent Publication No. 62-4950.

By combining the speed stages of the main transmission and the sub-transmission, an automatic transmission may have six forward gears, for example, when a main transmission having three forward gears and a sub-transmission having two forward gears are connected in series. An automatic transmission having five forward gears may be obtained by deleting any one gear from this automatic transmission having six forward gears.

When the main transmission and the sub-transmission are combined to construct one multistage automatic transmission, a main transmission is mounted on a first shaft (turbine shaft), which is connected to an engine output shaft through a torque converter, and a sub-transmission for changing and transmitting an output of the main transmission through a second shaft (main shaft of sub-transmission). It is known that the two transmissions are arranged so that axes of the respective shafts are spaced apart by a specified distance in parallel with each other. In this case, the transmission mechanisms of the two transmissions are coupled through a torque transmission means such as gears. The spacing between the axes of the first shaft and the second shaft is determined according to a position where the torque transmission means is permitted to operate in cooperation with the two transmission mechanisms and dimensions thereof.

The output of the sub-transmission is normally input directly to a differential of the vehicle, and the sub-transmission is normally arranged above the differential. Accordingly, the main transmission and the sub-transmission are generally arranged so that the level of the axis of the second shaft is at or above the level of the first shaft.

The main transmission and the sub-transmission each require a hydraulic housing to control supply and discharge of hydraulic pressure to and from the friction elements provided in the respective transmissions. When these valve bodies are mounted in an automatic transmission, the hydraulic housing for the main transmission, which is designed to set a line pressure of the hydraulic pressure to be supplied, is incorporated in an oil pan of a gear shifter arranged below the main transmission.

However, it is difficult to incorporate both the hydraulic housing of the sub-transmission in the oil pan and the hydraulic housing of the main transmission because of spatial limitations. In this case, it is important to lay out an oil path for connecting the hydraulic housing with the transmission mechanism of the sub-transmission which is as short as possible in order to ensure sufficient hydraulic responsiveness and improve controllability in the sub-transmission.

However, the hydraulic housing needs to have accessories such as a solenoid valve for switching hydraulic pressure and an oil path connecting portion which connects the oil path with the sub-transmission mounted in the same vicinity. Thus, it has been considerably difficult to design an hydraulic housing for controlling the hydraulic pressure which contains all the necessary accessories and oil paths in the small area around the gear shifter without problems and with high efficiency.

Accordingly, it is an object of the present invention to provide an automatic transmission which has overcome the above mentioned problems.

It is another object of the present invention to provide a multistage automatic transmission which is capable of shortening an interconnecting oil path with a transmission mechanism of a sub-transmission as much as possible and laying out accessories and a connecting portion of the interconnecting oil path without problems.

SUMMARY OF THE INVENTION

The invention is directed to an automatic transmission comprising the following elements: a first transmission mechanism having a friction element and a first shaft connectable to an output shaft of an engine, the first transmission mechanism being adapted for changing the torque speed of the engine output shaft; a first hydraulic housing for accommodating a control device for controlling a hydraulic pressure to the friction element of the first transmission mechanism; a second transmission mechanism associated with the first transmission mechanism, and having a friction element and a second shaft in parallel with the first shaft, the second transmission mechanism being adapted for changing the torque speed of the first shaft; and, a second hydraulic housing for accommodating a control device for controlling a hydraulic pressure to the friction element of the second transmission mechanism, the second hydraulic housing being arranged above the second transmission mechanism, such that an axis of the second shaft is positioned on the same horizontal plane as, or above, an axis of the first shaft.

The second hydraulic housing may be connected to the second transmission mechanism by a connecting member. The connecting member may be arranged between the first and second transmission mechanisms.

An accessory member of the second hydraulic housing may be arranged between the first and second transmission mechanisms.

The first hydraulic housing may be arranged below the first transmission mechanism. The friction element of the second transmission mechanism may be provided with a first hydraulic chamber having a large hydraulic area and a second hydraulic chamber having a small hydraulic area. The first hydraulic chamber may be made communicatable with the first hydraulic housing, whereby the friction element of the second transmission mechanism is actuatable at different speed stages.

With an automatic transmission so constructed, the second hydraulic housing is arranged above the second transmission. Accordingly, the second hydraulic housing can be laid out smoothly. In addition, oil paths connected to the friction element of the second transmission can be shortened as much as possible, thereby attaining sufficient responsiveness to hydraulic pressure and improving controllability.

Also, the connecting member or accessory member is arranged between the first and second transmissions so that space which had been previously wasted can be utilized effectively. Thus, an efficient layout is realized.

Further, the first hydraulic housing is arranged below the first transmission mechanism. The friction element of the second transmission mechanism is provided with a first hydraulic chamber having a large hydraulic area and a second hydraulic chamber having a small hydraulic area. The first hydraulic chamber is made to be communicatable with the first hydraulic housing. This can reduce the length of an oil path extending from the first hydraulic housing to the friction element of the second transmission mechanism, and enhance the responsiveness to the hydraulic pressure in the reverse mode, and simplifies the oil path construction of the second hydraulic housing to prevent a pressure drop along the oil path due to a passage resistance at a specified speed stage where a particularly high pressure is required.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENTS

Figure 1:
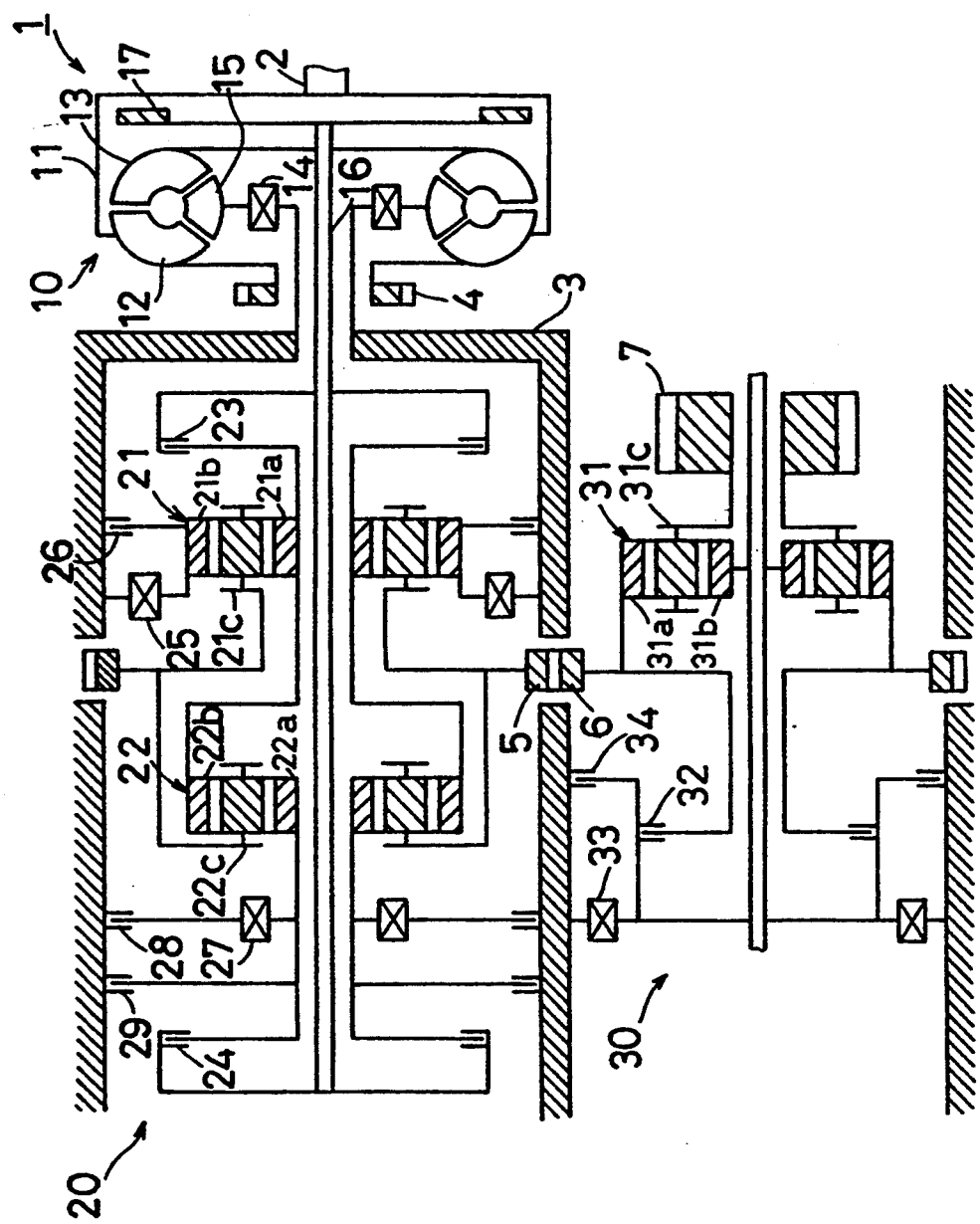
FIG. 1 is a diagram showing a multistage automatic transmission according to an embodiment of the invention.

As shown in FIG. 1, an automatic transmission 1 according to the invention includes a torque converter 10, a main transmission 20 arranged on the same axis as the torque converter 10, and a sub-transmission 30 arranged on an axis parallel to the axes of the above parts.

The torque converter 10 essentially consists of a pump 12, a turbine 13, a stator 15, a turbine shaft 16, and a lock-up clutch 17. The pump 12 is formed integrally with a casing 11 connected with an engine output shaft 2. The turbine 13 is arranged so as to be opposed to the pump 12 and is driven by hydraulic oil supplied by the pump 12. The stator 15 is arranged between the pump 12 and the turbine 13 and is supported on a casing 3 of the automatic transmission 1 through a one-way clutch 14. The turbine shaft 16 is coupled with the turbine 13. The clutch 17 couples the turbine shaft 16 directly with the engine output shaft 2 through the casing 3.

Between the torque converter 10 and the main transmission 20 is arranged an oil pump 4 which is driven by the engine output shaft 2 through the torque converter 10.

A specific internal construction of the main transmission 20 will now be described with reference to FIGS. 1 and 2.

The main transmission 20 includes front and rear planetary gear mechanisms 21, 22. The rear planetary gear mechanism 22 is arranged at a rear portion of the main transmission 20, and consists essentially of a sun gear 22a loosely fitted on the turbine shaft 16, a plurality of pinion gears engaged with the sun gear 22a, a ring gear 22b engaged with the respective pinion gears, and a pinion carrier 22c for rotatably supporting the respective pinion gears.

The front planetary gear mechanism 21, arranged at a front portion of the main transmission 20, is constructed similar to the rear planetary gear mechanism 22. Specifically, the mechanism 21 consists essentially of a sun gear 21a loosely fitted on the turbine shaft 16, a plurality of pinion gears engaged with the sun gear 21a, a ring gear 21b engaged with the respective pinion gears, and a pinion carrier 21c for rotatably supporting the respective pinion gears. The sun gear 21a of the rear planetary gear mechanism 21 is coupled with the ring gear 22b of the front planetary gear mechanism 22. Further, the pinion carriers 21c, 22c of the both planetary gear mechanisms 21, 22 are coupled with an intermediate gear 5 which transmits the output of the main transmission 20 to the sub-transmission 30.

A direct coupled clutch 24 is arranged in series between the sun gear 22a of the rear planetary gear mechanism 22 and the turbine shaft 16. Between the sun gear 22a and the fixed casing 3 are arranged a coast brake 29 for coupling the sun gear 22a with the casing 3, a second one-way clutch 27, and a 3-4 brake 28.

In the front planetary gear mechanism 21, a forward clutch 23 is arranged in series between the sun gear 21a and the turbine shaft 16. Between the ring gear 21b and the casing 3 are arranged a low-reverse brake 26 and a first one-way clutch 25.

With the main transmission 20 thus constructed, there are obtained forward low, middle, and high speed stages and a reverse speed stage.

Specifically, in a state where only the forward clutch 23 is engaged, the torque from the turbine shaft 16 is input to the sun gear 21a of the front planetary gear mechanism 21 and the ring gear 21b is fixed to the casing 3 through the first one-way clutch 25. Accordingly, the torque of the turbine shaft 16 is output to the intermediate gear 5 after having a speed thereof reduced at a large reduction ratio. In this way, the low speed stage is obtained.

When the 3-4 brake 28 is coupled at the stage of the low speed stage, the sun gear 22a of the rear planetary gear mechanism 22 is locked through the second one-way clutch 27. Accordingly, a torque transmitted from the turbine shaft 16 to the ring gear 22b of the rear planetary gear mechanism 22, through the forward clutch 23 and the sun gear 21a of the front planetary gear mechanism 21, is transmitted to the intermediate gear 5 from the pinion carrier 22c after having a speed thereof reduced at a reduction ratio smaller than the one at the low speed stage. In this way, the middle speed stage is obtained.

Further, when the direct coupled clutch 24 is coupled at the middle speed stage, the torque from the turbine shaft 16 is transmitted to the ring gear 22b of the rear planetary gear mechanism 22 both through the forward clutch 23 and the sun gear 21a of the front planetary gear mechanism 21, and through the direct coupled clutch 24 and the sun gear 22a of the rear planetary gear mechanism 22 simultaneously. Accordingly, the rear planetary gear mechanism 22 rotates entirely integrally, and torque equal to the torque of the turbine shaft 16 is transmitted from the pinion carrier 22c to the intermediate gear 5. In this way, the high speed stage (direct coupled speed stage) is obtained.

When the forward clutch 23 is released and the direct coupled clutch 24 is coupled with the low-reverse brake 26, the torque of the turbine shaft 16 is transmitted to the sun gear 22a of the rear planetary gear mechanism 22 while the ring gear 21b of the front planetary gear mechanism 21 is locked. The rotation of the turbine shaft 16 is reversed and output from the pinion carriers 21c, 22c of the both planetary gear mechanisms 21, 22 to the intermediate gear 5. In this way, the reverse speed stage is obtained.

During the deceleration at the low and middle speed stages, the first and second one-way clutches 25, 27 rotate idly and accordingly the engine brake does not work. In an engine brake range, there are obtained low and middle speed stages where the engine brake works by coupling the low-reverse brake 26 in parallel with the first one-way clutch 25 at the low speed stage, and by coupling the coast brake 29 in parallel with the second one-way clutch 27 at the middle speed stage.

Next, a specific internal construction of the sub-transmission 30 will be described with reference to FIGS. 1 and 3. The sub-transmission 30 includes an intermediate gear 6 engageable with the intermediate gear 5, a main shaft 35 as an output shaft of the automatic transmission 1, an output gear 7 as an output portion of the automatic transmission 1, and an planetary gear mechanism 31.

The planetary gear mechanism 31 consists essentially of a sun gear 31b fixed integrally with the main shaft 35, a plurality of pinion gears 31d engageable with a sun gear 31b, a ring gear 31a which is coupled with the intermediate gear 6 and engageable with respective pinion gears 31d, and pinion carrier 31c for rotatably supporting the respective pinion gears 31d. The pinion carrier 31c is coupled with the output gear 7 loosely fitted on the main shaft 35.

A direct coupled clutch 32 is arranged between the intermediate gear 6 and the main shaft 35. A speed reduction brake 34 and a third one-way clutch 33 are arranged between the clutch 32 and the casing 3. The torque of the intermediate gear 6 is transmitted to the output gear 7 through the planetary gear mechanism 31.

The direct coupled clutch 32 is constructed as follows. A plurality of friction plates 32c, 32d are alternately arranged between a hub member 32a, in which the intermediate gear 6 and the ring gear 31a of the planetary gear mechanism 31 are formed integrally, and a drum member 32b, formed integrally with the shaft 35 on which the sun gear 31b is secured. A first piston 32e having a large pressure area and a large diameter is arranged behind (to the left in the drawing of FIG. 3) these friction plates 32c, 32d. Further, a second piston 32f, having a small pressure area and a small diameter, is arranged behind the first piston. A return spring 32g is arranged for the pistons 32e, 32f.

A first hydraulic chamber 321, to which coupling pressure is supplied through an oil path 36, is provided circumferentially outward of the first piston 32e. A second hydraulic chamber 322 at the backside of the second piston 32f is provided to which coupling pressure is supplied through an oil path 37. When the same coupling pressure is supplied to both the first and the second hydraulic chambers 321, 322, a larger coupling pressure can be obtained in the first hydraulic chamber 321 than in the second hydraulic chamber 322.

The speed reduction brake 34 is constructed as follows. A plurality of friction Plates 34a, 34b are alternately arranged between the drum member 32b of the direct coupled clutch 32 and the casing 3. A piston 34d is provided to couple the friction plates 34a, 34b with one another against the opposing force of the return spring 34c. A first hydraulic chamber 341, having a large pressure area, is provided at the backside of the piston 34d, and a second hydraulic chamber 342 having a small pressure area is provided circumferentially outward of the piston 34d. The first and second hydraulic chamber 341, 342 are located concentrically. When the same coupling pressure is supplied to both the first and second hydraulic chambers 341, 342, a larger coupling pressure can be obtained in the first hydraulic chamber 341 than in the second hydraulic chamber 342.

This provides a torque capacity corresponding to the transmission torque at each speed stage, thereby eliminating complication of a hydraulic circuit and reduction in control accuracy. Specifically, this construction provides a capacity sufficient to transmit a large transmission torque when large transmission is required, and thus assures a reduced time to complete a gear shifting operation. Also, this construction will eliminate a drive loss of an oil pump and a shock when the gear is shifted, which the conventional multistage automatic transmissions have involved.

As described above, the sub-transmission 30 is capable of changing the torque transmitted from the main transmission 20 through the intermediate gears 5, 6 into forward low and high speed stages and transmitting the resultant torque to the output gear 7.

More specifically, in a state where the direct coupled clutch 32 is released, the sun gear 31b of the planetary gear mechanism 31 is locked by the third one-way clutch 33 or speed reduction brake 34. The torque from the intermediate gear 6, transmitted to the ring gear 31a of the planetary gear mechanism 31, is transmitted from the pinion gears 31c to the output gear 7 after having a speed thereof reduced. In this way, the low speed stage is obtained. In this case, the engine brake works for the sub-transmission 30 if the speed reduction brake 34 is coupled.

When the direct coupled clutch 32 is coupled and the speed reduction brake 34 is released, the ring gear 31a of the planetary gear mechanism 31 is coupled with the sun gear 31b. Accordingly, the torque from the intermediate gear 6 is transmitted from the pinion carrier 31c to the output gear 7 as it is. In this way, the high speed stage (direct coupled speed stage) is obtained.

As described above, three forward speed stages and one reverse speed stage are obtained by the main transmission 20, and high and low speed stages are obtained for each output of the main transmission 20 by the sub-transmission 30. Thus, six forward speed stages are obtained by the entire automatic transmission. A reverse speed stage for the automatic transmission is obtained by combining the reverse speed stage of the main transmission 20 with the low speed stage of the sub-transmission 30 (where the speed reduction brake 34 is coupled).

In one embodiment, five specified speed stages are adopted from the six forward speed stages. Operating states of the respective clutches and brakes at the respective speed stages, namely five forward speed stages and one reverse speed stage, are summarized in TABLE-1 below. In TABLE-1, (O) indicates that the clutch or brake is coupled only in the engine brake range.

matic transmission 1) is engaged with an input gear 9 of the differential DF.

The main transmission 20 and the sub-transmission 30 are laid out such that the axes Lm, Ls of the shafts 16, 35 are at least at the same level with respect to a vertical direction, and more preferably that the axis Ls of the shaft 35 is located above the axis Lm of the shaft 16.

An input side of the automatic transmission 1 (i.e. an input side of the main transmission 20) is connected with an engine E. By connecting the engine E and the automatic transmission 1 integrally in this manner, a power train is constructed. A mount member 446 for mounting the automatic transmission 1 of this power train on a vehicle body (see FIGS. 4 and 5) is arranged above a front end portion of the automatic transmission 1.

Further, a starter unit 447 is provided above the main transmission 20 at the side close to the sub-transmission 30, and a brake controller 448 is provided obliquely upward from the side of the sub-transmission 30 close to the main transmission 20. The brake controller 448 prevents wheels from being locked by controlling a braking force of each wheel according to the speed of the vehicle and the road condition when the braking is supplied. A battery BT is disposed above sub-transmission 30.

Figure 7:
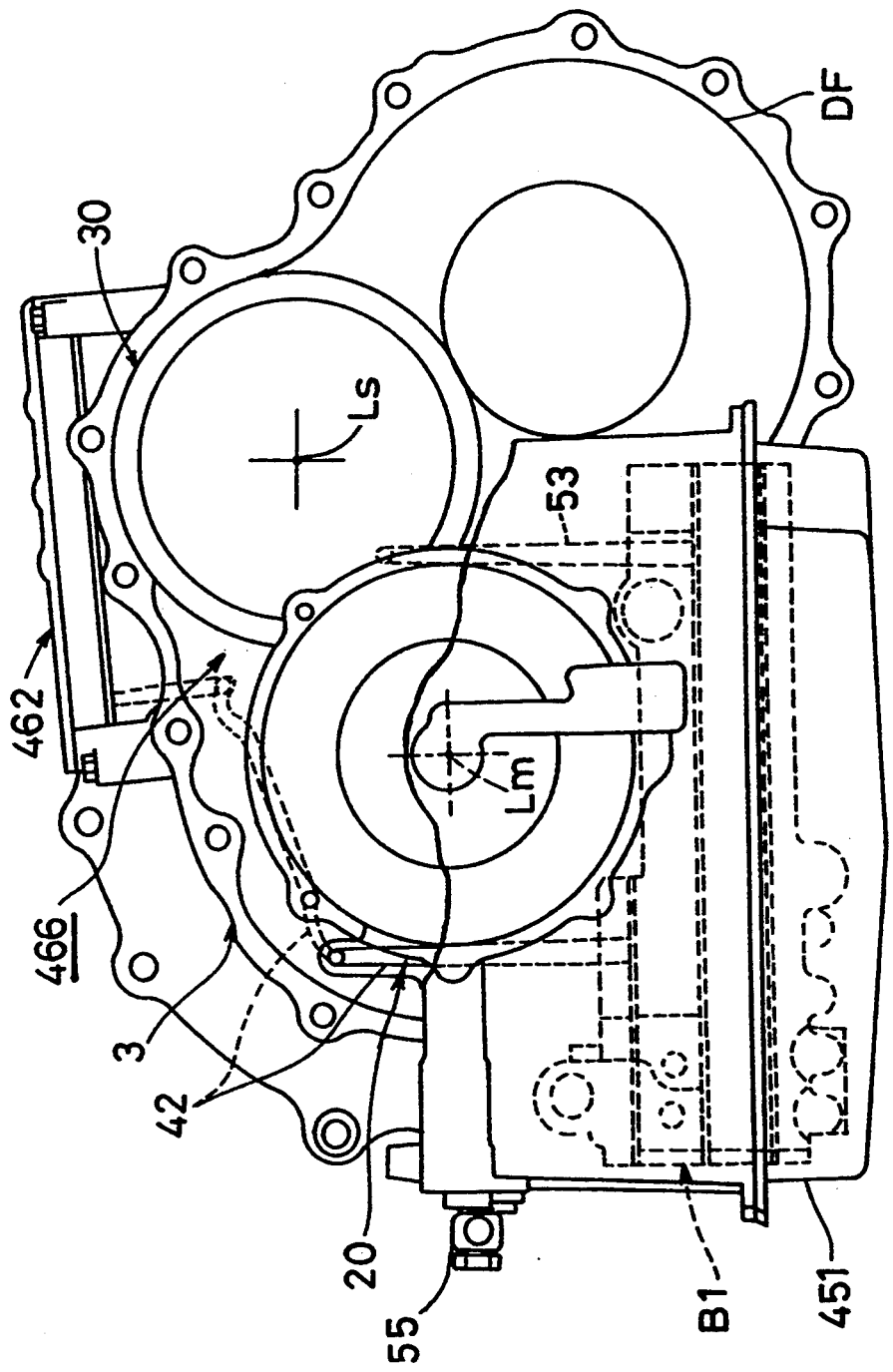
FIG. 7 is a front view showing an oil path extending from the main transmission to the sub-transmission.

An oil pan 451 for the automatic transmission 1 is mounted below the main transmission 20. As indicated by broken line in FIG. 7, a first hydraulic housing B1 is incorporated in the oil pan 451. The first hydraulic housing B1 controls the supply of the hydraulic pressure to the friction elements provided in the main transmission 20 such as the clutches 23, 24 and the brakes 26, 28, 29. Further, accumulators 51, 55, 84, and 90 for hydraulic pressure lines of the first hydraulic housing B1 are arranged beside the main transmission 20.

A second hydraulic housing B2 is arranged above the sub-transmission for controlling the supply of the hydraulic pressure to the friction elements in the subtransmission 30, such as the clutch 32 and the brake 34. Inter-

TABLE-1

| | | MAIN TRANSMISSION | | | | | | |
|---|---|---|---|---|---|---|---|---|
| GEAR | SPEED STAGE | D.C. CLUT. | F- CLUT. | 3-4 BRAKE | COAST BRAKE | L-R BRAKE | 1ST O.W. CLUTCH | 2ND O.W. CLUTCH |
| 1ST | LO | | O | | | (O) | LOCK | FREE |
| 2ND | LO | | O | | | (O) | LOCK | FREE |
| 3RD | MID | | O | O | O | | FREE | LOCK |
| 4TH | MID | | O | O | O | | FREE | LOCK |
| 5TH | HI | O | O | O | | | FREE | FREE |
| REV | REV | O | | | | O | FREE | FREE |

| | | SUB-TRANSMISSION | | |
|---|---|---|---|---|
| GEAR | SPEED STAGE | D.C. CLUT. | S.R. BRAKE | 3RD O.W. CLUT. |
| 1ST | LO | | O | LOCK |
| 2ND | HI | O | | FREE |
| 3RD | LO | | O | LOCK |
| 4TH | HI | O | | FREE |
| 5TH | HI | O | | FREE |
| REV | REV | | O | FREE |

Figure 4:
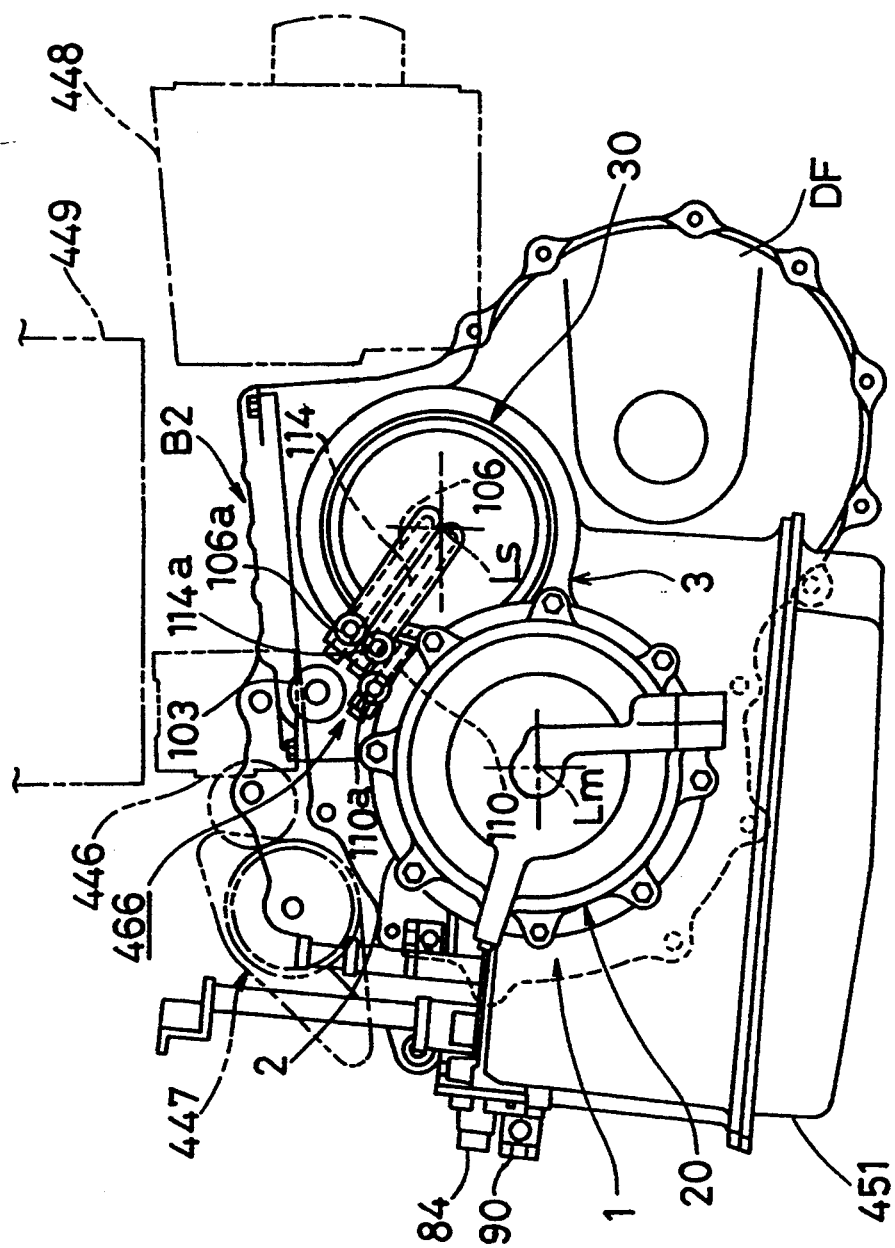
FIG. 4 is a front view showing the multistage automatic transmission.
Figure 5:
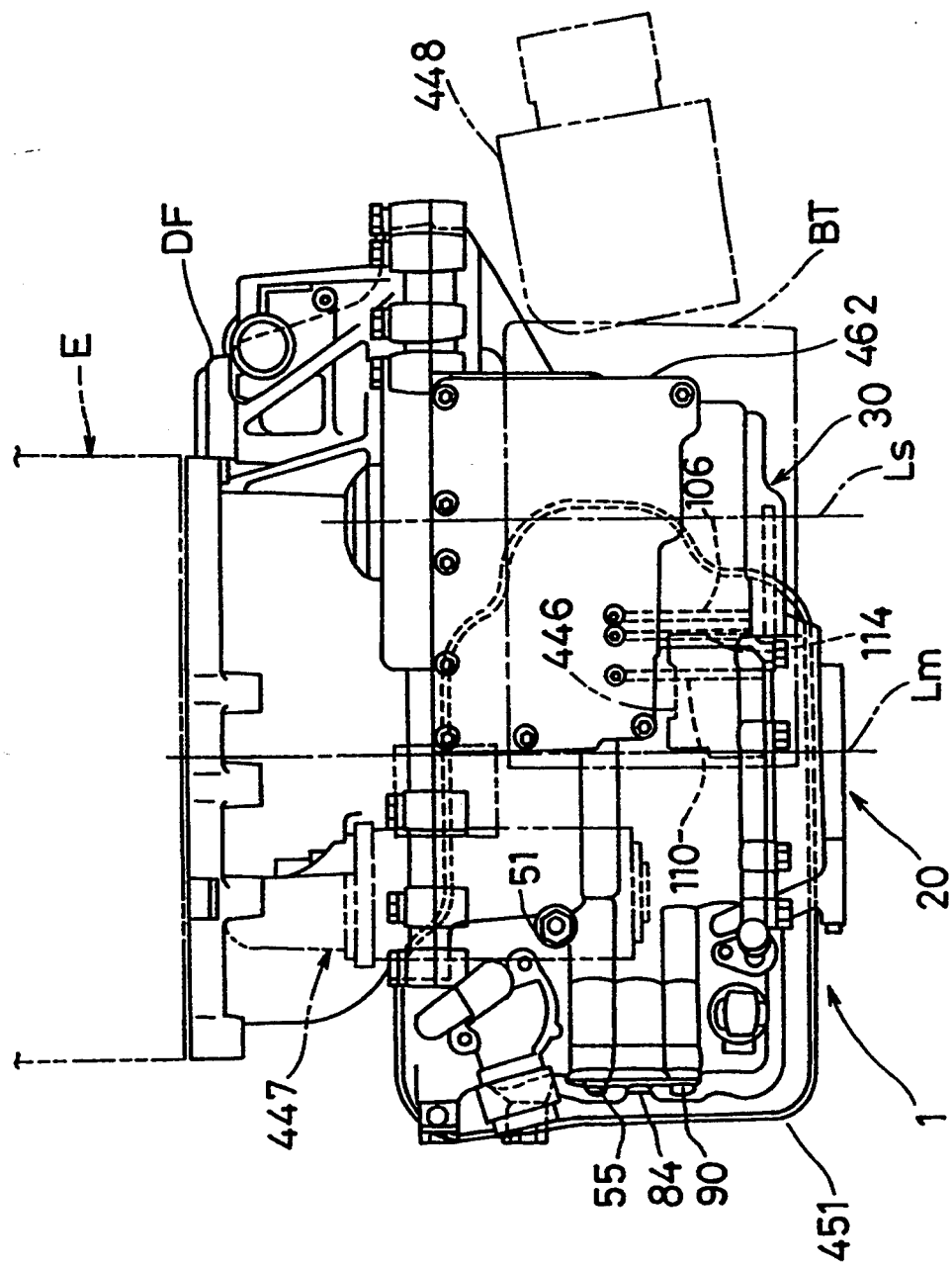
FIG. 5 is a plan view showing the multistage automatic transmission.
Figure 6:
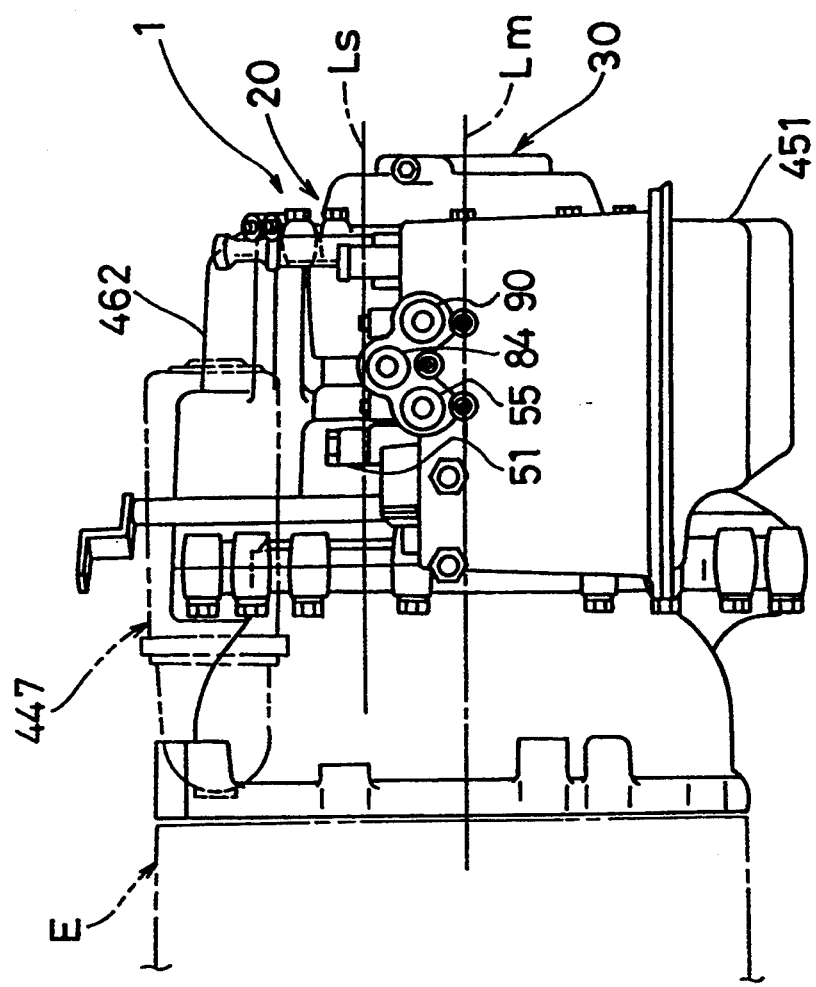
FIG. 6 is a side view showing the multistage automatic transmission.

In the embodiment shown in FIGS. 4 to 6, the turbine shaft 16 of the main transmission 20 and the main shaft 35 of the sub-transmission 30 extend in parallel with each other. A distance between axes Lm, Ls of the shafts 16, 35 is determined such that the intermediate gears 5, 6 for transmitting the torque between the two shafts 16, 35 are engageable smoothly.

Further, in this embodiment, the differential DF of the vehicle is arranged below the sub-transmission 30, and the output gear 7 (the output portion of the autoconnecting oil paths 106, 114, 110 (see FIGS. 4 and 5) extending from the second hydraulic housing B2 to the transmission mechanism of the sub-transmission 30 are arranged above a front portion of the sub-transmission 30.

By arranging the second hydraulic housing B2 above the sub-transmission 30 in this manner, the second hydraulic housing B2 can be laid out smoothly in the case where the differential DF is arranged below the subtransmission 30. In addition, interconnecting oil paths 106, 114, 110 with the transmission mechanism of the sub-transmission 30 can be shortened as much as possible, thereby attaining sufficient responsiveness to the hydraulic pressure and improving the controllability.

Figure 8:
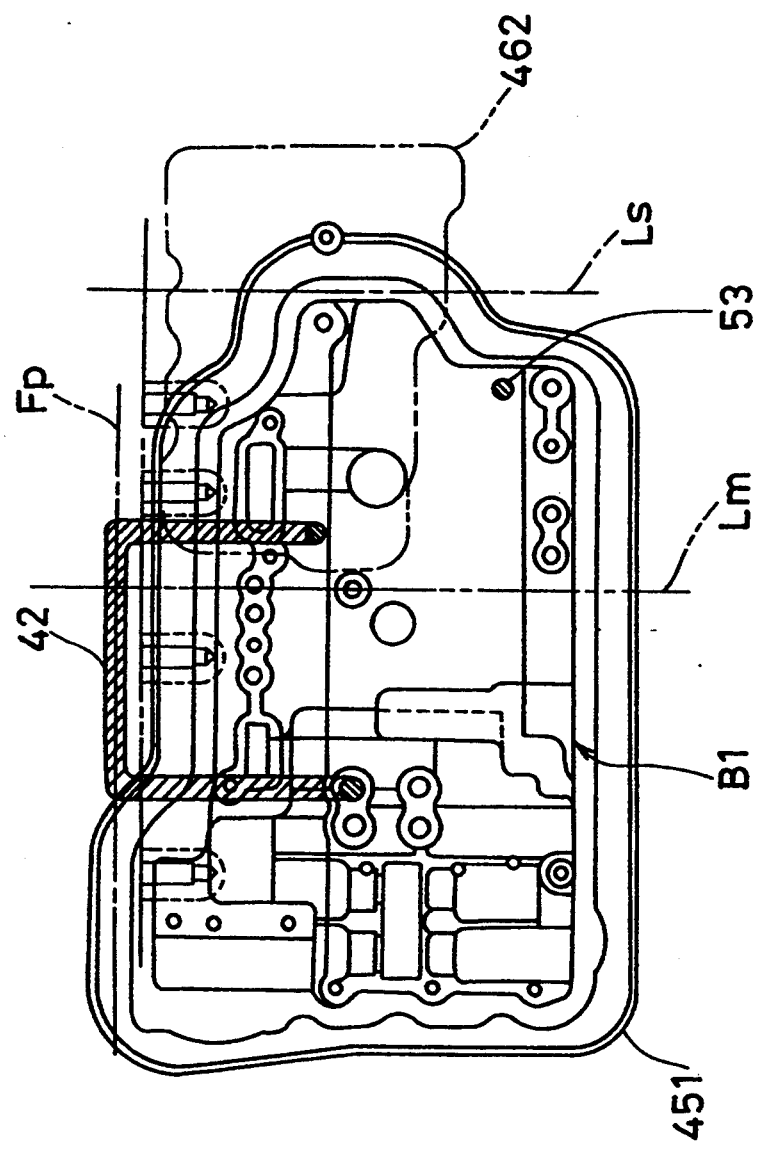
FIG. 8 is a plan view showing the oil path extending from the main transmission to the sub-transmission.

The second hydraulic housing B2 is in communication with the first hydraulic housing B1 through the interior of the casing 3 and an oil path 42 (see broken and oblique lined portion in FIGS. 7 and 8 respectively) passing through mating faces Fp of a housing and a cover of an unillustrated oil pump. A line pressure for the entire automatic transmission 1, including the main transmission 20 and the sub-transmission 30, is set in the first hydraulic housing B1. In other words, the hydraulic pressure is supplied to the second hydraulic housing B2 from the first hydraulic housing B1.

In the reverse mode, the hydraulic pressure is supplied to both the first and second hydraulic chambers 341, 342 and the speed reduction brake 34 is coupled at a maximum coupling force as described above. Accordingly, in this case, it is necessary to supply a large amount of oil to the subtransmission 30 as fast as possible.

In this embodiment, in order to attain the responsiveness to the hydraulic pressure in the reverse mode, an oil path 53 specially for use in the reverse mode is preferably provided to feed the oil from the first hydraulic housing B1 directly to the speed reduction brake 34 without feeding it through the second hydraulic housing B2.

More specifically, the second hydraulic housing B2 constituting the sub-transmission controller is disposed above the sub-transmission 30. The main line 42 and the reverse line 53 extend from the main transmission controller of the first hydraulic housing B1 to the sub-transmission, and hydraulic pressure is supplied through these lines to control the sub-transmission 30. The main line 42 is connected with the second hydraulic housing B2 and supplies the line pressures to the respective parts provided in the second hydraulic housing B2. The reverse line 53 is connected directly with the first hydraulic chamber 341 of the speed reduction brake 34 of the sub-transmission 30, while passing through the manual valve 43 in the first hydraulic housing B1 and the casing 3, without being connected with the second hydraulic housing B2.

Providing an oil path 53 specially for use in the reverse mode greatly reduces the length of the oil path extending from the first hydraulic housing B1 to the speed reduction brake 34, and enhances responsiveness in the reverse mode to hydraulic pressure.

Further, the oil path construction of the second hydraulic housing B2 is simplified and the oil path extending from the manual valve 43 to the first hydraulic chamber 341 of the speed reduction brake 34 is shortened. This prevents a pressure drop along the oil path due to a passage resistance and maintains the coupling pressure supplied to the speed reduction brake at a specified level in the reverse gear (where a particularly high pressure is required).

Further, in this embodiment, connecting portions 106a, 114a, 110a of the oil paths 106, 114, 110 connecting between the second hydraulic housing B2 and the transmission mechanism of the sub-transmission 30 are arranged at a valley portion (upper valley portion) 466 defined between an outer circumference of a portion of the casing 3, at the side of the main transmission 20, and an outer circumference of a portion of the casing 3 at the side of the sub-transmission 30. A solenoid valve 103, as an accessory of the second hydraulic housing B2 for switching the hydraulic pressure, is also arranged in the valley portion 466.

By arranging the solenoid valve 103 and the connecting portions 106a, 114a, 110a in the valley portion 466, the space of the valley portion 466 which has been considered merely as dead space can be utilized effectively, thereby realizing an efficient layout.

A hydraulic circuit 40 for forming the speed stage according to the operating state or requirements of an operator by selectively coupling the clutches and brakes will now be described in accordance with TABLE-1.

Figure 9A:
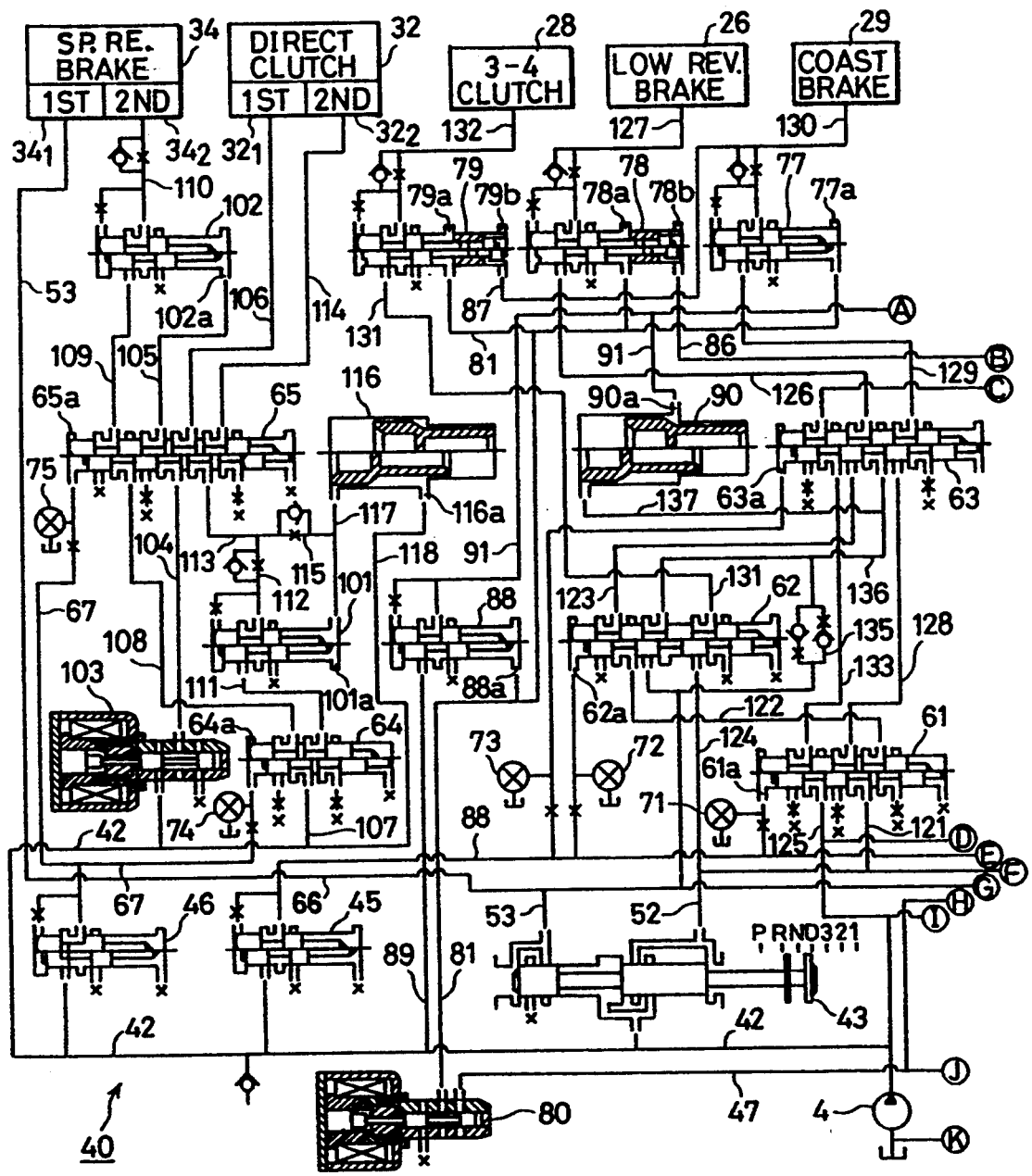
FIGS. 9A and 9B are circuit diagrams showing a hydraulic circuit of the automatic transmission.
Figure 9B:
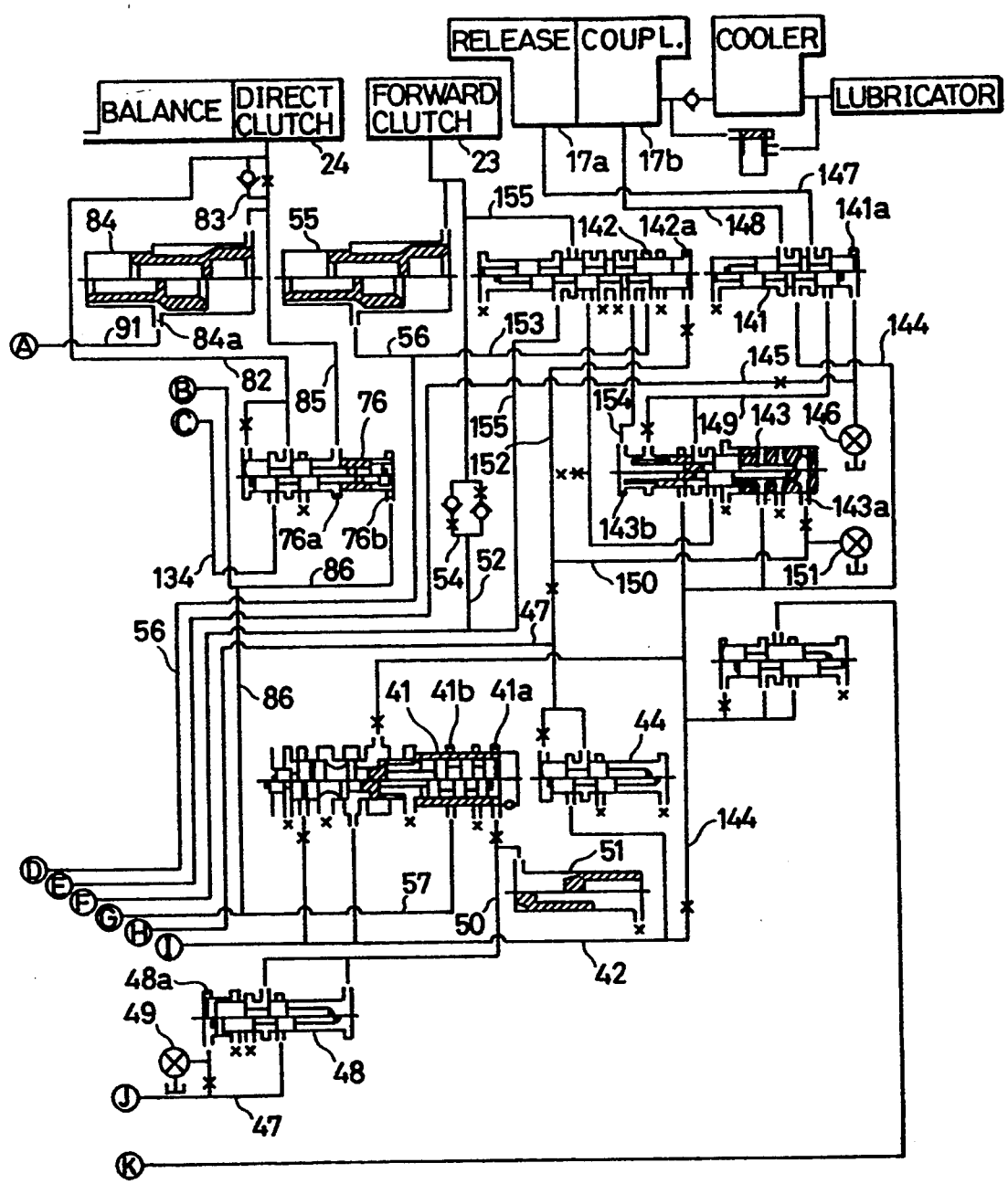

As shown in FIGS. 9A and 9B, the hydraulic circuit 40 includes a regulator valve 41 for regulating the pressure of the hydraulic oil discharged from the oil pump 4 into the line pressure of a specified level. The line pressure regulated by the regulator valve 41 is supplied through a main line 42 to a manual valve 43 operated by the operator, and to first to third reducing valves 44, 45, 46 for generating a source pressure to be used for various controls.

The source pressure, reduced to a specified level by the first reducing valve 44, is supplied to a modulator valve 48 through a line 47. A control pressure regulated by a duty solenoid valve 49 is supplied to a control port 48a of the modulator valve 48. A modulator pressure is generated from the source pressure according to a duty cycle (a ratio of an on-time to one cycle time) of the duty solenoid valve 49, and is supplied to a first boosting port 41a of the regulator valve 41 through a line 50. Thus, the line pressure is boosted according to the duty cycle. In this case, if the duty cycle is set, for example, according to a throttle opening of the engine, the line pressure is adjusted to a value according to the throttle opening.

A first accumulator 51 for suppressing the pulsation of the hydraulic pressure resulting from a cyclic on-off operation of the duty solenoid valve 49 is arranged at a specified position along the line 50 for supplying the modulator pressure to the first boosting port 41a of the regulator valve 41.

The manual valve 43 is capable of setting various forward ranges of D (drive), 3, 2, 1, a R(reverse)-range, a N(neutral)-range, and a P(parking)-range. The main line 42 is connected to a forward line 52 in the forward ranges, while being connected to the reverse line 53 in the R-range.

The forward line 52 leads to the forward clutch 23 through an orifice whose opening is made different at times when the hydraulic oil is supplied and discharged. Accordingly, the forward clutch 23 is coupled constantly in the forward ranges of D, 3, 2, 1. In this case, a second accumulator 55 for moderating a shock when the coupling pressure is supplied to the forward clutch 23 is arranged at a specified position along the forward line 52. A back pressure is supplied to the accumulator 55 from the main line 42 through a line 56.

The reverse line 53 leads directly to the first hydraulic chamber 341 having the large pressure area of the speed reduction brake 34 in the sub-transmission 30. Accordingly, in the R-range, the speed brake 34 is coupled with a large coupling force by the line pressure supplied to the first hydraulic chamber 341. A line 57, extending to a second boosting port 41b of the regulator valve 41, is branched off from the reverse line 53 so as to increase the adjusted value of the line pressure in the R-range.

On the other hand, the line pressures to first to third shift valves 61, 62, 63 provided in the main transmission 20, and to fourth and fifth shift valves 64, 65 provided in the sub-transmission 30, are provided from the main line 42, the forward line 52 and the reverse line 53. The first to fifth shift valves 61 to 65 are all used to shift gears.

Shift valves 61 to 65 have control ports 61a to 65a provided at one end thereof respectively. A source pressure line 66, extending from the second reducing valve 45, is connected to the control ports 61a to 63a of the first to third shift valves 61 to 63 of the main transmission 20. A source pressure line 67, extending from the third reducing valve 46, is connected to the control ports 64a, 65a of the fourth and fifth shift valves 64, 65 of the sub-transmission 30.

First to fifth on-off solenoid valves 71 to 75 in correspondence with the first to fifth shift valves 61 to 65 are arranged at specified positions along the source pressure lines 66, 67. In the on-states, these on-off solenoid valves 71 to 75 release the hydraulic pressures in the control ports 61a to 65a of the corresponding shift valves 61 to 65. Accordingly, spools of the respective shift valves 61 to 65 are positioned at the left side in the drawing of FIGS. 9A and 9B when the corresponding on-off solenoid valves 71 to 75 are on, and are positioned at the right side when these valves are off.

A line extending from the main line 42, the forward line 52, or the reverse line 53 to the clutches and the brakes is selectively connected according to a combination of on- and off-states of the solenoid valves 71 to 75, i.e. a combination of the spool positions of the shift valves 61 to 65, and the clutches and the brakes are coupled as shown in TABLE-1, thereby providing first to fifth gears and a reverse gear. In this case, the coupling pressures supplied to the clutches and the brakes are controllably set at proper values as follows.

Control valves 76, 77, 78, 79 for reducing the line pressure to the coupling pressure of the specified level are provided respectively for the direct coupled clutch 24, the coast brake 29, the low-reverse brake 26, and the 3-4 brake 28. The control pressures regulated by a first linear solenoid valve 80 are supplied to control ports 77a, 78a, 79a of the control valves 77, 78, 79, and the coupling pressures are controlled in the control ports according to the control pressures.

Coupling pressure supplied to the direct coupled clutch 24 through a line 82, is supplied to the control port 76a of the control valve 76 through a line 85 having a one-way orifice 83 and a third accumulator 84 arranged therealong. The rise of the coupling pressure is controlled by the operation of the accumulator 84.

The first linear solenoid valve 80 regulates the control source pressure, supplied from the first reducing valve 44 through the line 47, in accordance with a control signal from a controller (see FIG. 10), and generates the control pressure according to the temporary speed stage and operating state. A line 86 is connected to ports 76b, 78b of the control valves 76 and 78 respectively. The line 86 is branched off from the reverse line 53 so as to prevent a pressure regulating operation. The pressure is supplied to these ports 76b, 78b in the R-range and the spools are locked at the left side positions, and thereby the pressure regulating operations of the control valves 76, 78 are deterred. Further, the coupling pressure is supplied to a port 79b provided at one end of the control valve 79 through a line 87 when the coupling pressure is supplied to the coast brake 29, and thereby the pressure regulating operation of the control valve 79 is controlled.

The control pressure generated by the first linear solenoid valve 80 is also supplied to the control Port 88a of the control valve 88 through a line 81. The control valve 88 regulates the line pressure supplied from the line 42 through the line 89 according to the control pressure from the first linear solenoid valve 80, and the back pressures are generated and supplied to back pressure ports 84a, 90a of the third and fourth accumulators 84, 90.

A control valve 101, 102, and a second linear solenoid valve 103 are provided as a means for controlling the coupling pressure in the sub-transmission 30. The control valve 101 regulates the coupling pressure to be supplied to the first and second hydraulic chambers 321, 322 defined in the direct coupled clutch 32. The control valve 102 regulates the coupling pressure supplied to the second hydraulic chamber 342 defined in the speed reduction brake 34. The first hydraulic chamber 341 defined in the speed reduction brake 34 is supplied directly with pressure directly from the manual valve 43 through the reverse line 53 in the R-range, as described above.

Line pressure as the control source pressure from the main line 42 is supplied to the second linear solenoid valve 103. The line pressure is supplied to the control port 102a of the control valve 102 from the line 104 and the fifth shift valve 65, through the line 105 or line 106, after being regulated in accordance with the control signal from a controller. Alternatively, the valve 103 is brought into communication with the first hydraulic chamber 321 of the direct coupled clutch 32 so as to regulate the hydraulic pressure in the hydraulic chamber 321. The control valve 102 regulates the line pressure supplied thereto from the main line 42 through the line 107, the fourth shift valve 64, the line 108, the fifth shift valve 65, and a line 109 according to the control pressure. The regulated line pressure is supplied to the second hydraulic chamber 342 of the speed reduction brake 34.

The line pressure from the main line 42 is supplied to the control valve 101 through the line 107, the fourth shift valve 64, and a line 111. After regulating the line pressure, the valve 101 supplies the line pressure through a one-way orifice 112, a line 113, the fifth shift valve 65, and the line 106 or line 114, selectively through the first and second hydraulic chambers 321 or 322.

The coupling pressure supplied to the first or second hydraulic chambers 321 or 322 of the direct coupled clutch 32 is supplied to the control port 101a of control valve 101 as the control pressure, through the line 117, along which the one-way orifice 115 and the fifth accumulator 116 are arranged. Accordingly, the coupling pressure is built up through a specified step-wise transition state by the operation of the firth accumulator 116. The back pressure from the main line 42 is supplied to the back pressure port 116a of the accumulator 116 through the line 118.

In the hydraulic circuit thus constructed, the combination patterns of the on- and off-states of the first to fifth on-off solenoids valves 71–75 are as shown in TABLE-2. In this way, there are obtained forward first to fifth gears and one reverse gear. In TABLE-2, (1), (2) denote first and second gears in the engine brake range.

TABLE-2

| ON-OFF SOLENOID VALVE | P | R | N | 1 | D, 3, 2, 1 | | | | | |
|---|---|---|---|---|---|---|---|---|---|---|
| | | | | | (1) | 2 | (2) | 3 | 4 | 5 |
| 1ST | OFF | OFF | OFF | ON | ON | ON | ON | OFF | OFF | OFF |
| 2ND | OFF | OFF | OFF | OFF | OFF | OFF | OFF | ON | ON | ON |
| 3RD | OFF | OFF | OFF | OFF | ON | OFF | ON | ON | ON | OFF |
| 4TH | OFF | OFF | OFF | OFF | OFF | ON | ON | OFF | ON | ON |
| 5TH | OFF | OFF | OFF | OFF | OFF | OFF | OFF | OFF | ON | ON |

The specific relationship between the combinations of on- and off-states of the solenoid valves 71 to 75 and the speed stages will now be described in accordance with TABLE-2.

In the engine brake nonworking first gear adopted when the manual valve 43 is set in the D-range, the first to third on-off solenoid valves 71 to 73 are on, off, off respectively in the main transmission 20, and the spools of the first to third shift valves 61 to 63 are positioned at the left, right, and right sides respectively. In this state, a line 121 branched off from the forward line 52 communicates with a line 122 through the first shift valve 61 and with a line 123 through the second shift valve 62. However, the line 123 is closed by the third shift valve 63. Likewise, a line 124 branched off from the forward line 52 and a line 125 branched off from the main line 42 are closed by the second and first shift valves 62, 61 respectively. Thus, in this case, only the forward clutch 23 which is constantly coupled in the forward range is coupled as described above, and the low speed stage where the engine brake does not work is obtained in the main transmission 20.

In the sub-transmission 30, the fourth and fifth on-off solenoids 74, 75 are off and thereby the spools of the fourth and fifth shift valves 64, 65 are both positioned at the right side. Accordingly, the main line 42 is brought into communication with the line 108 through the line 107 and the fourth shift valve 64, and with the line 109 extending to the control valve 102 through the fifth shift valve 65, thus the line pressure is supplied to the control valve 102. At this time, the control pressure generated by the second linear solenoid valve 103 is supplied to the control port 102a of the control valve 102 through the line 104, the fifth shift valve 65, and the line 105, and is regulated into the coupling pressure of the specified level according to the control pressure. Thereafter, the coupling pressure is supplied to the second hydraulic chamber 342 of the speed reduction brake 34 through a line 110 to couple the brake 34.

Further, the direct coupled clutch 32 is released by bringing the first hydraulic chamber 321 into communication with a drain port of the fourth shift valve 64 through the line 106, the fifth shift valve 65, the line 113, the control valve 101, and a line 111 and by bringing the second hydraulic chamber 322 into communication with a drain port of the fifth shift valve 65 through a line 114. As a result, the sub-transmission 30 is set at the low speed stage where the engine brake works, and the automatic transmission 1 is set in the engine brake nonworking first gear.

In the engine brake working first gear adopted by the first and second ranges, the third solenoid valve 73 of the main transmission 20 is turned on in response to the engine brake nonworking first gear. Accordingly, the spool of the third shift valve 63 is positioned at the left side. Thus, in this case, the forward line 52 is brought into communication with a line 126 extending to the control valve 78 through the line 121 branched off from the forward line 52, the first shift valve 61, a line 122, the second shift valve 62, a line 123, and the third shift valve 63. Consequently, the line pressure is supplied to the control valve 78.

The line pressure supplied to the control valve 78 is regulated into the coupling pressure according to the control pressure supplied to the control port 78a from the first linear solenoid valve 80 through the line 81, and is supplied to the low-reverse brake 29 through the line 127. In this way, the low-reverse brake 29 is coupled in addition to the forward clutch 23 and the low speed stage where the engine brake works is set in the main-transmission 20. Since the speed reduction brake 34 is coupled similar to the case of the engine brake nonworking first gear in the sub-transmission 30, the automatic transmission 1 is allowed to have the engine brake working first gear.

In the engine brake nonworking second gear adopted in the D-range and the engine brake working second gear adopted in the first and second ranges, the speed stage of the sub-transmission 30 changes when the automatic transmission is in the engine brake working first gear and the engine brake nonworking first gear.

More specifically, the fourth on-off solenoid valve 74 of the sub-transmission 30 is turned on and the spool of the fourth shift valve 64 is positioned at the left side. Accordingly, the line pressure supplied to the fourth shift valve 64 from the main line 42 through the line 107 is supplied to the control valve 101 through the line 111, and is supplied to the first hydraulic chamber 321 of the direct coupled brake 32 through the line 113, the fifth shift valve 65, and the line 106 after being built up to a specified level. Thus the sub-transmission 30 is set at the high speed stage, with the result that the automatic transmission is allowed to have an engine brake nonworking second gear and an engine brake working second gear.

In the third gear, the first to third on-off solenoid valves 71 to 73 are turned off, on, on respectively in the main transmission 20, and the spools of the first to third shift valves 61 to 63 are positioned at the right, left, and left sides. In this case, a line 121 branched off from the forward line 52 is brought into communication with a line 128 through the first shift valve 61 and with a line 129 extending to the control valve 77 through the shift valve 63. Accordingly, the line pressure is supplied to control valve 77 and is regulated into the specified coupling pressure according to the control pressure supplied from the first linear solenoid valve 80 through the line 81. The obtained coupling pressure is supplied to the coast brake 29 through a line 130 to thereby couple the coast brake 29.

The other line 124 branched off from the forward line 52 is brought into communication with a line 131 extending to the control valve 79 through the second shift valve 62 so that the line pressure is supplied to the control valve 79. To this control valve 79 are supplied the control pressure from the first linear solenoid valve 80 through the line 81 and the coupling pressure supplied to the coast brake 29 as the control pressure through the line 87. The coupling pressure regulated according to these control pressures is supplied to the 3-4 brake 28 through a line 132.

As a result, the 3-4 brake 28 is coupled in addition to the forward clutch 23 in the main transmission 20. Further, since the coast brake 29 is also coupled, there can be obtained an engine brake working middle speed stage.

On the other hand, in the sub-transmission 30, the fourth and fifth on-off solenoid valves 74, 75 are both off and the engine brake working low speed stage is set similar to the case of the aforementioned first gear. Accordingly, the automatic transmission 1 is allowed to have an engine brake working third gear having a specified reduction ratio.

In the fourth gear, the fourth and fifth on-off solenoid valves 74, 75 of the sub-transmission 30 are both turned on from the stage of the above third gear, and the spools of the fourth and fifth shift valves are positioned at the left side. Accordingly, similar to the case of the aforementioned second gear, the line pressure is supplied to the control valve 101 from the main line 42 through the line 107, the fourth shift valve 64, and the line 111. The line pressure is regulated into the specified coupling pressure in the control valve 101 and is supplied to the second hydraulic chamber 322 of the direct coupled clutch 32 from the line 113 and the fifth shift valve 65 through the line 114. As a result, the direct coupled clutch 32 is coupled to set the sub-transmission 30 at the high speed stage. Since the main transmission 20 is set at the middle speed stage similar to the case of the aforementioned third gear, the automatic transmission 1 is allowed to have the fourth gear.

In the fifth gear, the first to third on-off solenoid valves 71 to 73 of the main transmission 20 are turned off, on, off and the spools of the first to third shift valves 61 to 63 are positioned at the right, left, and right sides. Accordingly, the line 125 branched off from the main line 42 is brought into communication with a line 133 through the first shift valve 61 and with a line 134 extending to the control valve 76 through the third shift valve 63, so that the line pressure is supplied to the control valve 76. The coupling pressure regulated by the control valve 76 is supplied to the direct coupled clutch 24 through the line 82 to thereby couple the clutch 24. Thus, in the main transmission 20, the forward clutch 23 and the direct coupled clutch 24 are coupled and the main transmission 20 is set at the high speed stage. When the direct coupled clutch 24 is coupled, the coupling pressure is supplied after a specified step transition phase by the action of the third accumulator 84.

On the other hand, the fourth and fifth on-off solenoid valves 74, 75 are both on in the sub-transmission 30 similar to the case of the aforementioned fourth gear, and the sub-transmission 30 is set at the high speed stage. As a result, the automatic transmission is allowed to have a fifth gear.

Further, in the reverse gear where the manual valve 43 is set in the R-range, the reverse line 53 is brought into communication with the main line 42 through the manual valve 43 and the first to third on-off solenoid valves 71 to 73 are all turned off. Thus, the spools of the first to third shift valves 61 to 63 are all positioned at the right side.

The line 125 branched off from the main line 42 is brought into communication with the line 133 through the first shift valve 61 similar to the case of the aforementioned fifth gear and with the line 134 through the control valve 76 through the third shift valve 63. Accordingly, the line pressure is supplied to the control valve 76. In this case, the line pressure is supplied to one port 76b of the control valve 76 from the reverse line 53 through the line 86 and the spool of the control valve 76 is locked at the left side. Thus, the line pressure supplied through the line 134 is supplied directly to the direct coupled clutch 24 through the line 82 without being reduced, so that the direct coupled clutch 24 is coupled at a high coupling pressure.

The reverse line 53 is in communication with the control valve 78 through a line 136 including an orifice 135 having different aperture amounts in supplying and discharging directions of the hydraulic pressure. The third shift valve 63, and the line 126, and the line pressure is supplied to the control valve 78 similar to the case of the engine brake working first gear. In this case, to one port 78b of the control valve 78 is supplied the line pressure through the line 86 branched off from the reverse line 53 and the spool of the control valve 78 is locked at the left side. Thus, the line pressure supplied through the line 126 is supplied directly to the low-reverse brake 26 without being regulated by the control valve 78 and the low-reverse brake 26 is coupled at a high coupling pressure.

Thereby, in the main transmission 20, the direct coupled clutch 24 and the low-reverse brake 26 are coupled and the reverse speed stage is obtained. In the sub-transmission 30, the fourth and fifth on-off solenoid valves 74, 75 are both off and the engine brake working low speed stage is set. Therefore, the reverse gear having a large reduction ratio can be obtained.

When the coupling pressure is supplied to the low-reverse brake 26, the hydraulic oil is introduced into the fourth accumulator 90 from the line 136 through a line 137. Thereby, the coupling pressure is built up gradually through the specified step-wise pressure state.

In addition to the above construction, the hydraulic circuit 40 includes first and second lock-up shift valves 141, 142 for controlling the lock-up clutch 17 provided in the torque converter 10, and a lock-up control valve 143.

A converter line 144 extends to the first lock-up shift valve 141 and the control valve 143 from the main line 42. The control line 66, extending to the second reducing valve 45, is connected through a line 145 to a control port 141a provided at one end of the first lock-up shift valve 141. In the line 145 is disposed an on-off solenoid valve 146 for controlling the lock-up clutch 17. When the valve 146 is off, the control pressure is supplied to the control port 141a of the first lock-up shift valve 141 and the spool of the valve 141 is positioned at the left side. At this time, the converter line 144 is brought into communication with a release line 147 extending to a lock-up releasing chamber 17a provided in the torque converter 10, and thereby the lock-up clutch 17 is released.

On the other hand, when the on-off solenoid valve 146 is turned on and the control pressure is released from the control port 141a of the first lock-up shift valve 141, the spool of the valve 141 is positioned at the right side. Thereupon, the converter line 144 is brought into communication with a coupling line 148 extending to a lock-up coupling chamber 17b provided in the torque converter 10, and the lock-up clutch 17 is coupled. At this time, the releasing line 147 is brought into communication with the lock-up control valve 143 through the first lock-up shift valve 141 and a line 149, and the hydraulic pressure regulated by the control valve 143 is supplied as a lock-up releasing pressure to the releasing chamber 17b of the lock-up clutch 17.

More specifically, a control line 150 extending from the first reducing valve 44 is connected to a control port 143a provided at one end of the control valve 143. In this control line 150 is disposed a duty solenoid valve 151 which regulates the control pressure supplied to the control port 143a according to a duty cycle of a control signal fed to the duty solenoid valve 151. In this way, the releasing pressure is regulated.

The control pressure generated by the duty solenoid valve 151 is also supplied to a control port 142a of the second lock-up shift valve 142 through a line 152. When the control pressure is not higher than a specified level, the spool of the second lock-up shift valve 142 is positioned at the right side. Thereby, a line 153 extending from the main line 42 through the line 56 is brought into communication with a pressure regulation preventing port 143b of the control valve 143 through a line 154 and the line pressure is supplied to the port 143b. This prevents the pressure regulating operation of the releasing pressure by the control valve 143. At this time, the lock-up clutch 17 is in a completely coupled state where only the coupling pressure is supplied thereto.

When the control pressure becomes not lower than the specified value, the pressure regulating operation of the releasing pressure is carried out by the control valve 143. The lock-up clutch 17 is slip-controlled according to the releasing pressure. The spool of the second lock-up shift valve 142 is positioned at the right side when the control pressure is not supplied, so as to open up a line 155 bypassing an orifice 54 provided in the line 52 extending to the forward clutch 23.

Figure 10:
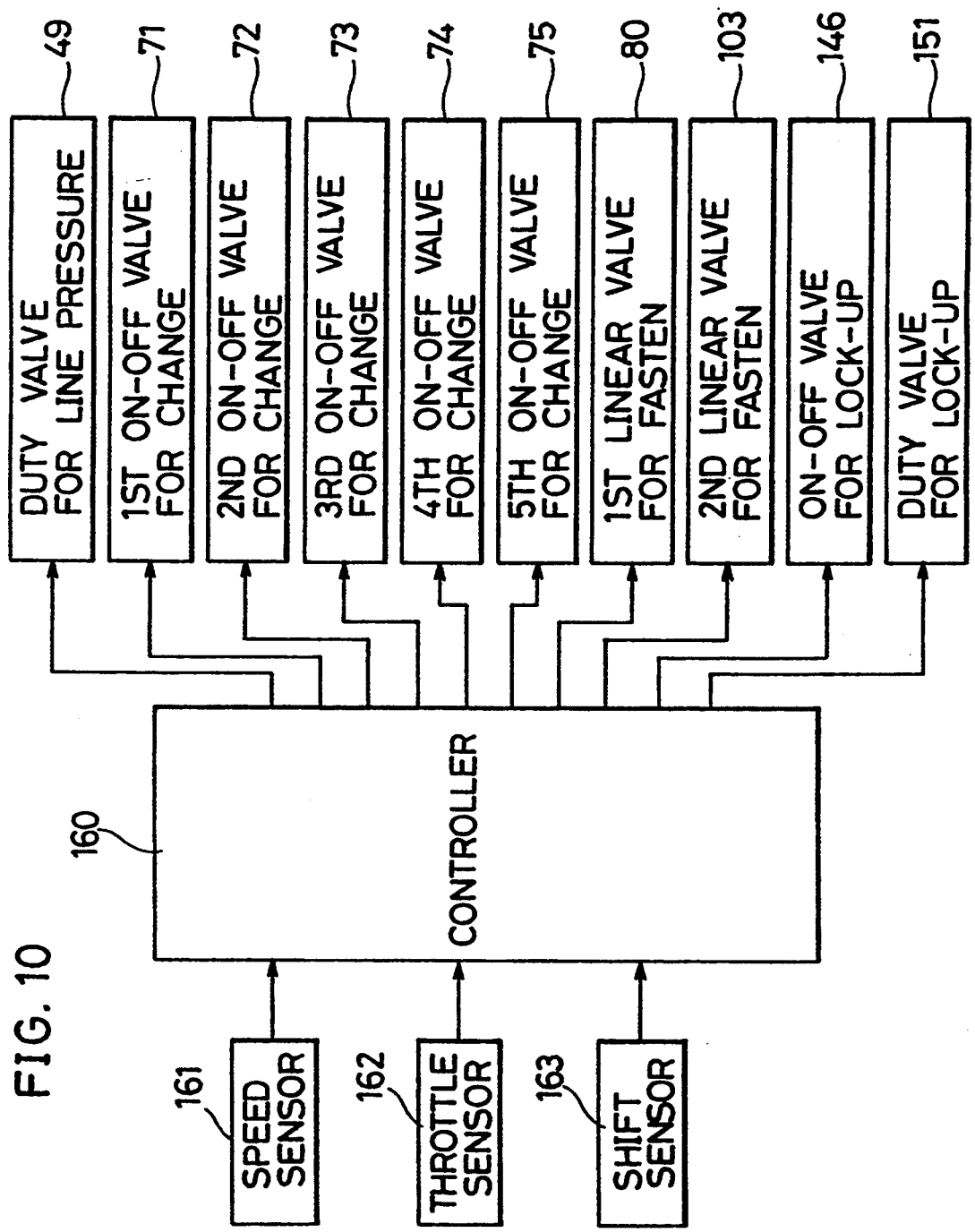
FIG. 10 is a control system for controlling solenoid valves in the hydraulic circuit shown in FIGS. 9A and 9B.

The duty solenoid valve 49 provided in the hydraulic circuit 40, the first to fifth on-off solenoid valves 71 to 75, the first and second linear solenoid valves 80, 103, the on-off solenoid valve 146, and the duty solenoid valve 151 are controlled in accordance with control signals from a controller 160 as shown in FIG. 10. To the controller 160 are input sensor signals from a speed sensor 161 for detecting the speed of the vehicle, a throttle opening sensor 162 for detecting a throttle opening of the engine, and a sensor 163 for detecting a shift position (range) selected by the operator. The aforementioned solenoid valves are controlled according to the operating state and the requirements of the operator represented by these signals.

The automatic transmission 1 according to the invention is constructed as described above. In this automatic transmission 1, the speed reduction brake 34 of the sub-transmission 30 is coupled in the reverse gear and forward first and third gears as is clear from the above description. In this case, a large torque capacity is required in the reverse gear since the reduction ratio of the main transmission 20 is large and a maximum engine output may be transmitted. On the contrary, in the first and third gears, since the third one-way clutch 33 arranged in parallel with the speed reduction brake 34 (see FIG. 1) receives the torque during the acceleration, it is sufficient that the brake 34 transmits the torque only during the deceleration (the engine brake works) when the third one-way clutch 33 rotates idly. In this case, since the transmission torque is very small, it is sufficient for the torque capacity to be small. In other words, the speed reduction brake 34 requires the torque capacities differing greatly at the speed stages. If the hydraulic pressure is controlled so as to provide the corresponding torque capacity, the control range becomes considerably wide, thereby inviting the complicated control and the reduction in the control accuracy.

Figure 2:
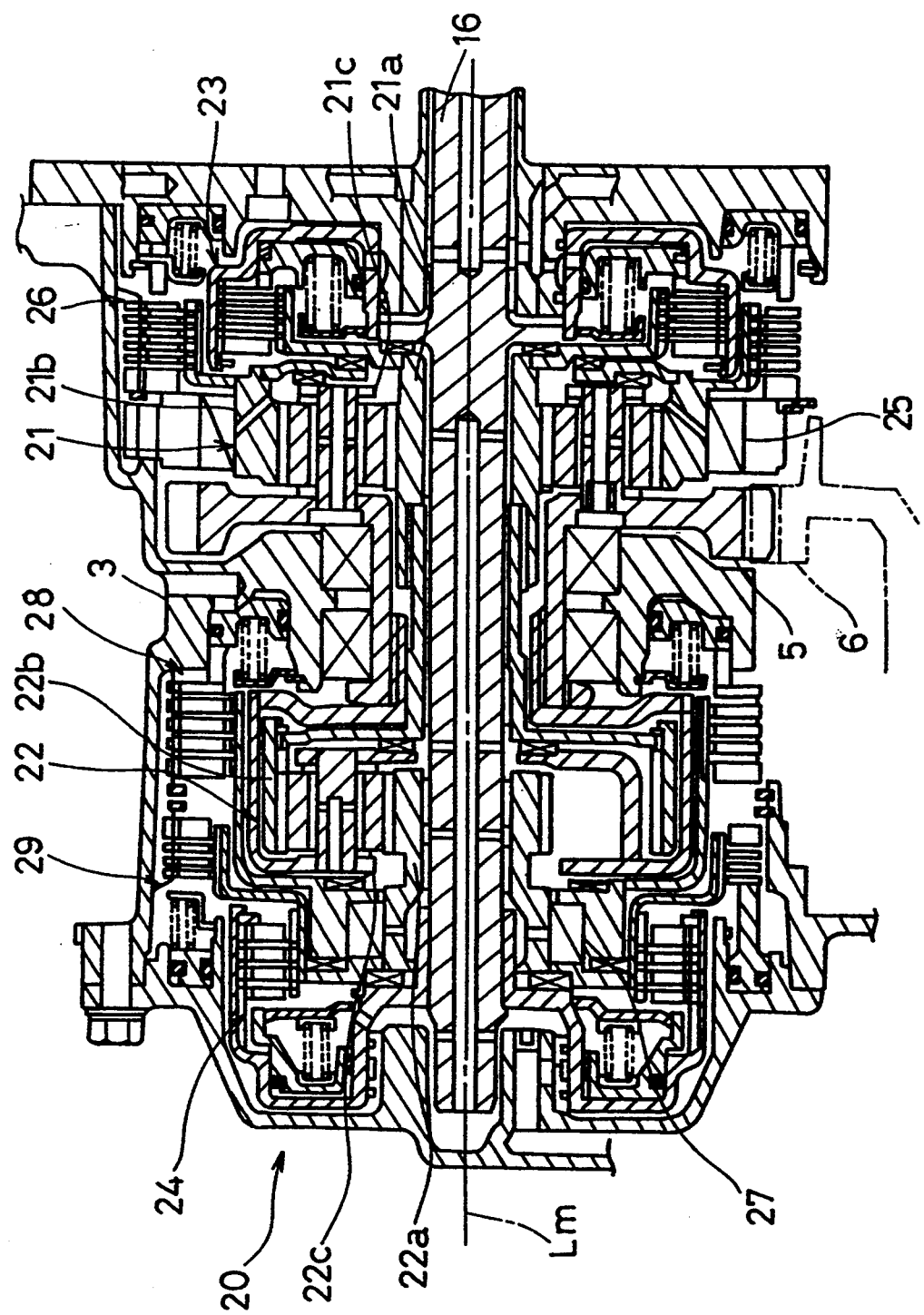
FIG. 2 is a sectional view showing a main transmission of the multistage automatic transmission.

In view of this, the speed reduction brake 34 is provided with the first hydraulic chamber 341 having the large pressure area and the second hydraulic chamber 342 having the small pressure area as the hydraulic chambers to which the coupling pressure is supplied as shown in FIG. 2. In addition, the hydraulic circuit 40 responds as follows.

In the reverse gear, the reverse line 53 extending from the manual valve 43 (see FIG. 3) leads to the first hydraulic chamber 341 of the speed reduction brake 34. By operating the manual valve 43 in the R-position, the line pressure is supplied directly to the hydraulic chamber 341. Accordingly, the torque capacity corresponding to the large transmission torque is obtained in the reverse gear without requiring a control of increasing the hydraulic pressure and the like.

Figure 11:
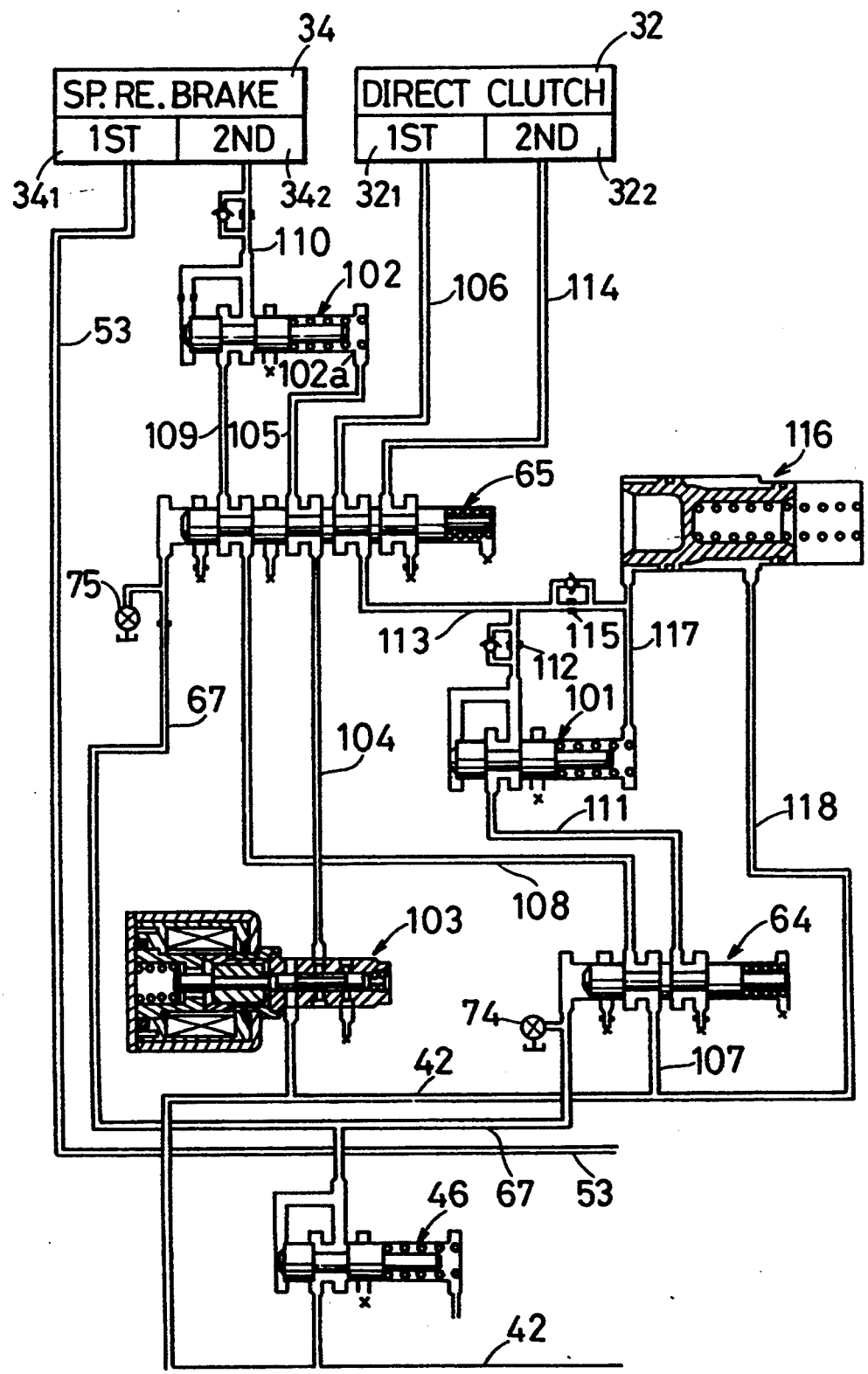
FIG. 11 is a circuit diagram showing a construction of a sub-transmission controller in the hydraulic circuit.

On the other hand, the fourth and fifth on-off solenoid valves 74, 75 are both off and the spools of the fourth and fifth shift valves 64, 65 are positioned at the right side when the engine brake is operated in the first and third gears as shown in FIG. 11. Accordingly, the line pressure is supplied to the control valve 102 from the main line 42 through the line 107, the fourth shift valve 64, the line 108, the fifth shift valve 65, and the line 109. The line pressure is supplied to the second hydraulic chamber 342 of the speed reduction brake 34 through the line 110 after being regulated according to the control pressure supplied to the control port 102a from the second linear solenoid valve 103 in the control valve 102. The speed reduction brake 34 is thus coupled. However, in this case, the coupling pressure is supplied to the second hydraulic chamber having the small pressure area and is regulated as above. Therefore, the coupling force of the brake 34 and the torque capacity are both set at very small values corresponding to the small transmission torque when the engine brake works.

In this way the speed reduction brake 34 is coupled in the reverse gear and during the working of the engine brake in the first and third gears, while the transmission torque differs greatly. However, in any case, the brake 34 is coupled at the coupling force corresponding to the transmission torque.

Particularly with the above construction, the line pressure is supplied directly to the first hydraulic chamber 341 having the large pressure area from the manual valve 43 in the reverse gear where a large coupling force is required. Accordingly, it is sufficient for the linear solenoid valve 103 for regulating the coupling force to regulate only the very low coupling pressure which is required during the working of the engine brake in the first and third gears. Thus, the control is simplified and the control range is narrowed, resulting in high control accuracy.

Figure 3:
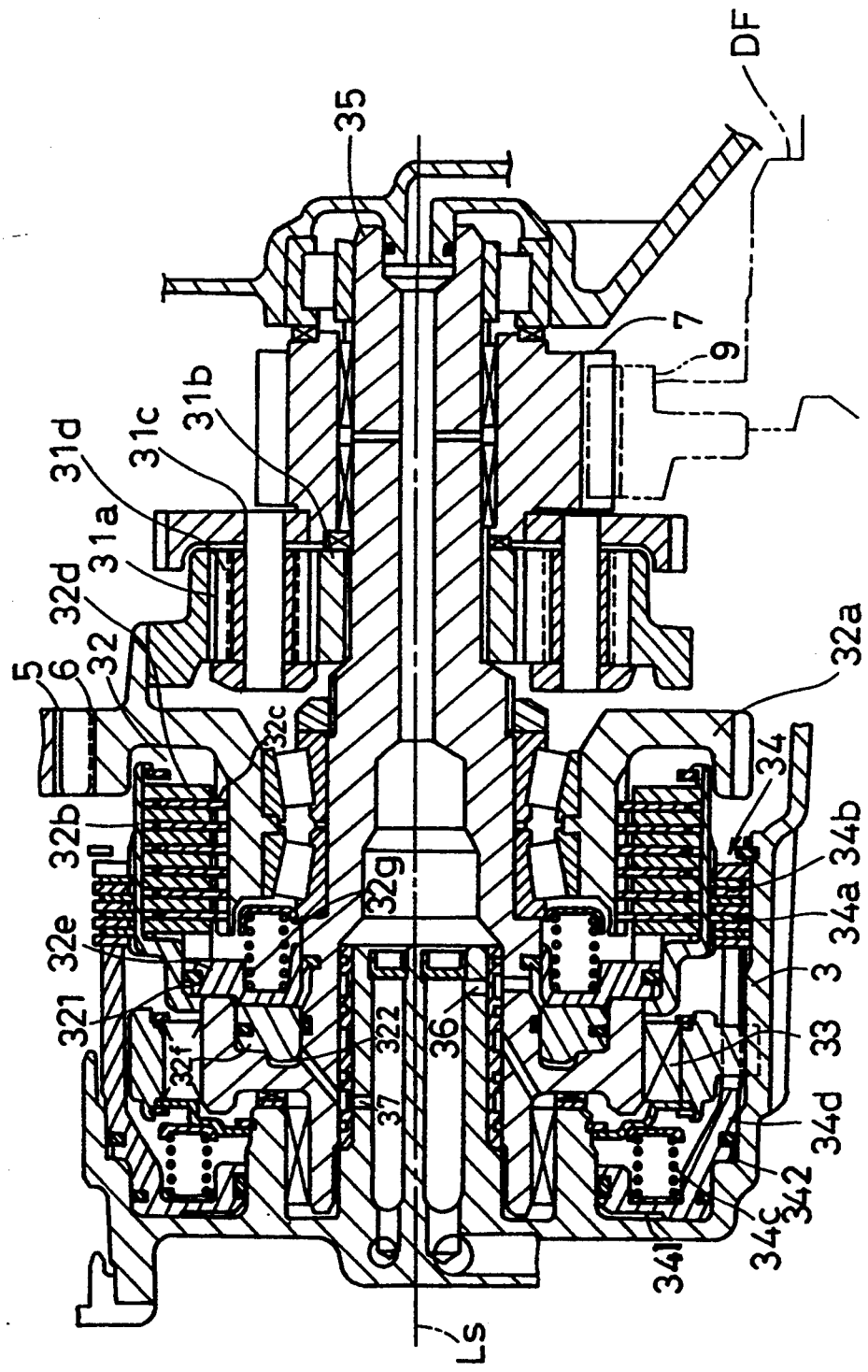
FIG. 3 is a sectional view showing a sub-transmission of the multistage automatic transmission.

In the foregoing embodiment, as shown in FIG. 3, the first and second hydraulic chambers 321, 322 of the direct coupled clutch 32 are defined in the two pistons 32e, 32f, whereas the first and second hydraulic chambers 341, 342 of the speed reduction brake 34 are defined in the single piston 34d. However, it may be appropriate that the former pair is defined in a single piston and the latter pair is defined in two pistons, or that both pairs are defined in two or one pistons.

Although the present invention has been fully described by way of example with reference to the accompanying drawings, it is to be understood that various changes and modifications will be apparent to those skilled in the art. Therefore, unless such changes and modifications depart from the scope of the present invention, they should be construed as being included therein.

What is claimed is:

1. An automatic transmission comprising:
   a first transmission mechanism having a friction element and a first shaft connectable to an output shaft of an engine, the first transmission mechanism being adapted for changing the torque speed of the engine output shaft;
   a first hydraulic housing for accommodating a control device for controlling a hydraulic pressure to the friction element of the first transmission mechanism;
   a second transmission mechanism associated with the first transmission mechanism, and having a friction element and a second shaft in parallel with the first shaft, the second transmission mechanism being adapted for changing the torque speed of the first shaft;
   a second hydraulic housing for accommodating a control device for controlling a hydraulic pressure to the friction element of the second transmission mechanism, the second hydraulic housing being arranged above the second transmission mechanism; and
   an axis of the second shaft being positioned on either the same horizontal plane as an axis of the first shaft or a horizontal plane above the axis of the first shaft.

2. An automatic transmission as defined in claim 1 wherein the second hydraulic housing is connected to the second transmission mechanism by a connecting member, and the connecting member is arranged in a space defined by the first and second transmission mechanisms.

3. An automatic transmission as defined in claim 1 wherein the second hydraulic housing has an accessory member, and the accessory member is arranged in a space defined by the first and second transmission mechanisms.

4. An automatic transmission as defined in claim 1 wherein the first hydraulic housing is arranged below the first transmission mechanism, and the friction element of the second transmission mechanism includes a first hydraulic chamber having a large hydraulic area and a second hydraulic chamber having a small hydraulic area, the friction element being actuatable at different speed stages, and the first hydraulic chamber is communicatable with the first hydraulic housing.

* * * * *